United States Patent
Andreas-Schott et al.

(10) Patent No.: US 10,141,583 B2
(45) Date of Patent: Nov. 27, 2018

(54) BIPOLAR PLATE AND FUEL CELL COMPRISING A BIPOLAR PLATE OF THIS TYPE

(71) Applicant: Volkswagen AG, Wolfsburg (DE)

(72) Inventors: Benno Andreas-Schott, Sassenburg/OT Triangel (DE); Markus Ritter, Braunschweig (DE); Christian Martin Zillich, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 267 days.

(21) Appl. No.: 15/300,677

(22) PCT Filed: Apr. 2, 2015

(86) PCT No.: PCT/EP2015/057351
§ 371 (c)(1),
(2) Date: Sep. 29, 2016

(87) PCT Pub. No.: WO2015/150536
PCT Pub. Date: Oct. 8, 2015

(65) Prior Publication Data
US 2017/0110739 A1    Apr. 20, 2017

(30) Foreign Application Priority Data

Apr. 2, 2014    (DE) .................. 10 2014 206 335

(51) Int. Cl.
*H01M 8/04*    (2016.01)
*H01M 8/0258*    (2016.01)
(Continued)

(52) U.S. Cl.
CPC ....... *H01M 8/0258* (2013.01); *H01M 8/0202* (2013.01); *H01M 8/026* (2013.01);
(Continued)

(58) Field of Classification Search
CPC ............. H01M 8/0258; H01M 8/2483; H01M 8/0202; H01M 8/026; H01M 8/0267;
(Continued)

(56) References Cited

U.S. PATENT DOCUMENTS

| | | | |
|---|---|---|---|
| 4,988,583 A | 1/1991 | Watkins et al. | |
| 6,207,312 B1 * | 3/2001 | Wynne | H01M 8/023 |
| | | | 429/480 |

(Continued)

FOREIGN PATENT DOCUMENTS

| | | |
|---|---|---|
| DE | 10015360 A1 | 10/2001 |
| DE | 10163631 A1 | 7/2003 |

(Continued)

*Primary Examiner* — Raymond Alejandro
(74) *Attorney, Agent, or Firm* — Davidson, Davidson & Kappel, LLC

(57) ABSTRACT

A bipolar plate for a fuel cell, including a profiled anode plate and a profiled cathode plate, each having an active region and two distribution regions for feeding and discharging operating media to and from the active region, and each distribution region having a main anode-gas port for supplying and evacuating fuel, a main cathode-gas port for supplying and evacuating oxidant and a main coolant port for supplying and evacuating coolant, the ports being arranged along a lateral edge of the bipolar plate. The plates are stacked so that the bipolar plate has channels interconnecting the main operating media ports of both distribution regions, and the distribution regions have at least one overlapping section, in which the channels overlap such that they do not form fluidic connections. A fuel cell is also provided. The main cathode-gas port is arranged between the main anode-gas port and the main coolant port and, starting from the main cathode-gas port, cathode channels run rectilinearly at least over the distribution region of the bipolar plate.

9 Claims, 8 Drawing Sheets

(51) Int. Cl.
*H01M 8/2483* (2016.01)
*H01M 8/026* (2016.01)
*H01M 8/0267* (2016.01)
*H01M 8/0202* (2016.01)
*H01M 8/04089* (2016.01)
*H01M 8/1004* (2016.01)
*H01M 8/241* (2016.01)
*H01M 8/0247* (2016.01)
*H01M 8/1018* (2016.01)

(52) U.S. Cl.
CPC ..... *H01M 8/0267* (2013.01); *H01M 8/04089* (2013.01); *H01M 8/1004* (2013.01); *H01M 8/241* (2013.01); *H01M 8/2483* (2016.02); *H01M 8/0247* (2013.01); *H01M 2008/1095* (2013.01); *H01M 2250/20* (2013.01)

(58) Field of Classification Search
CPC ........... H01M 8/04089; H01M 8/1004; H01M 8/241; H01M 8/0247; H01M 2008/1095; H01M 2250/20
See application file for complete search history.

(56) References Cited

U.S. PATENT DOCUMENTS

| | | |
|---|---|---|
| 8,158,299 B2 | 4/2012 | Blank et al. |
| 20,164,559 | 6/2012 | Darling |
| 8,614,030 B2 * | 12/2013 | Hood .................... H01M 8/021 429/514 |
| 15,380,745 | 12/2015 | Boden et al. |
| 2004/0076869 A1 * | 4/2004 | Zhang ................. H01M 8/0258 429/437 |
| 2004/0110057 A1 | 6/2004 | Yoshimoto et al. |
| 2006/0035133 A1 | 2/2006 | Rock et al. |

FOREIGN PATENT DOCUMENTS

| | | |
|---|---|---|
| DE | 10323646 A1 | 12/2004 |
| DE | 10394052 T5 | 11/2005 |
| DE | 102005057045 A1 | 6/2007 |
| DE | 102008056900 | 5/2010 |
| WO | WO2004070859 | 8/2004 |
| WO | WO2005112163 A2 | 11/2005 |
| WO | WO2009082337 | 7/2009 |
| WO | WO2014001842 | 1/2014 |

* cited by examiner

BIPOLAR PLATE AND FUEL CELL COMPRISING A BIPOLAR PLATE OF THIS TYPE

The present invention relates to a bipolar plate for a fuel cell, including a profiled anode plate and a profiled cathode plate, each having an active area and two distributor areas for the supply and removal of operating media to and from the active area, respectively, the distributor areas each having an anode gas main port for the supply and discharge of fuel, a cathode gas main port for the supply and discharge of oxidants, and a coolant main port for the supply and discharge of coolant, which are situated along a lateral edge of the bipolar plate, the plates being formed and situated one over another in such a way that the bipolar plate has channels for the operating media, which connect the operating means main ports of both distributor areas to one another, and the distributor areas have at least one overlap section, in which the channels overlap one another in a non-fluidically connected way. Furthermore, the present invention relates to a fuel cell including such a bipolar plate.

BACKGROUND

Fuel cells use the chemical reaction of a fuel with oxygen to form water, in order to generate electrical energy. For this purpose, fuel cells contain, as the core component, the so-called membrane-electrode assembly (MEA), which is a composite made of an ion-conductive, in particular proton-conductive membrane and an electrode (anode and cathode) situated on either side of the membrane. In addition, gas diffusion layers (GDL) may be situated on both sides of the membrane-electrode assembly, on the sides of the electrodes facing away from the membrane. In general, the fuel cell is formed by a plurality of MEAs situated in a stack, the electrical powers of which are added together. During operation of the fuel cell, the fuel, in particular hydrogen $H_2$ or a hydrogen-containing gas mixture, is supplied to the anode, where an electrochemical oxidation of $H_2$ to form $H^+$ with the emission of electrons takes place. A (water-bound or water-free) transport of the protons $H^+$ from the anode chamber into the cathode chamber takes place via the electrolyte or the membrane, which separates the reaction chambers from one another in a gas-tight manner and electrically insulates them. The electrons provided at the anode are conducted via an electrical line to the cathode. Oxygen or an oxygen-containing gas mixture is supplied to the cathode, so that a reduction of $O_2$ to form $O^{2-}$ with absorption of the electrons takes place. At the same time, these oxygen anions react in the cathode chamber with the protons transported via the membrane to form water. Due to the direct conversion of chemical energy into electrical energy, fuel cells achieve an improved efficiency in relation to other electricity generators because of the avoidance of the Carnot factor.

The fuel cell is formed by a plurality of membrane-electrode assemblies situated in the stack, so that reference is also made to a fuel cell stack. A bipolar plate, which ensures a supply of the individual cells with the operating media, i.e., the reactants and a coolant liquid, is situated between each two membrane-electrode assemblies. In addition, the bipolar plates ensure an electrically conductive contact to the membrane-electrode assemblies. Furthermore, they ensure a sealed separation between anode chamber and cathode chamber.

The bipolar plates are usually constructed from two profiled electrode plates, which have a structure in the form of a vertical profile situated on both sides of the plates. More or less discrete channels, which are designed to guide the operating media, result due to this profile on both sides of the plates. The operating media are in turn separated from one another by the plates, so that the coolant is guided in the interior of the plate, while the reactant gases are guided outside. The channels of the reactant gases are delimited, on the one hand, by the particular plate and, on the other hand, by a gas diffusion layer.

The bipolar plates may have different structures for distributing the reactants (fuel and oxidants) over the membrane surface. For this purpose, for example, the channels described in U.S. Pat. No. 4,988,583 are known, which are guided in a meandering form over the plate. They ensure a good uniform distribution of the operating media at both low and high flow rates. However, meandering structures have the disadvantage that at high flow rates, they cause large pressure losses from a first distributor area (inlet) to a second distributor area (outlet). The necessity thus arises of supplying the operating media at high pressure, which results in energy losses for the overall system.

In contrast, if the operating media are guided by a plurality of linear channels from the first distributor area to the second distributor area, irregular distribution occurs regularly at high flow rates as a result of the lack of a possibility for lateral distribution of the flow. However, they have a substantially lower pressure loss over the length of the fuel cell than the meandering structures.

In addition, pressure differences between adjacent flow channels are of substantial importance for the design of a fuel cell. Serpentine flow channels as described in WO 2005/112163 A2 are known for homogenizing the pressures both between distributor areas and also between the channels. Serpentine flows generally have an odd number of legs, which extend in the form of hairpin turns over the distributor areas or the bipolar plate. Different widths, depths, and lengths of the flow channels are used in this case to change the hydraulic cross section of the channels locally in such a way that targeted pressure differences arise, which accelerate the operating media within the channels or even to promote a transverse flow over the MEA.

DE 103 94 052 T5 describes, as a refinement, a flow field of a PEM fuel cell, which includes flow channels having branching overlap sections adjoining the distributor areas, to reduce the pressure differences between the distributor areas.

To intentionally achieve a transverse flow of the operating means across the area of the bipolar plate, DE 101 63 631 A1 provides a special arrangement of webs on the surface of the bipolar plate, multiple webs interrupted by outlets being situated in succession within a row.

In a comparable approach, DE 10 2005 057 045 A1 describes a structure of a bipolar plate, the typical channel structure being interrupted in the distributor area in favor of a structure which is made of minimal support points.

In addition, the goal is pursued in the development of fuel cells of further reducing the height of a bipolar plate and therefore the height of the fuel cell stack. The problem results from the reduction of the height of the bipolar plates that the overall height also has to be reduced in inflow areas of the fluids from the ports situated on the edge to the actual fluid channels in order to be able to reduce the height of the entire bipolar plate. On the one hand, the inflow area is to occupy a preferably small installation space, on the other hand, it is to be sufficiently large so as to ensure a uniform distribution of the fluids. This is problematic in particular for hollow embossed bipolar plates, for example, made of thin metal plates, because the fluids intersect in the inflow area. This means that the height of the inflow area has to be reduced still further.

A bipolar plate is known from unexamined published application DE 100 150360 A1, in which an intersection of fluids in thin bipolar plates is implemented, a cooling fluid being guided transversely via a perpendicularly situated structure of the gas guiding channels. The channel depth may be reduced on the anode and cathode sides in the areas in which the cooling fluid intersects.

SUMMARY OF THE INVENTION

Therefore, in these approaches, the hydraulic cross section of the channels is made worse to the disadvantage of the pressure conditions.

It is an object of the present invention to provide a bipolar plate, the hydraulic cross section of which is optimized in such a way that the pressure loss is reduced. In particular, in water-producing areas of the fuel cell, an unfavorable hydraulic cross section (i.e., an excessively high flow resistance for the flowing operating means) and in particular cross-sectional reductions due to height reduction and hairpin turns in the channels results in an increased occurrence of water accumulations and, accompanying this, clogging, which is to be avoided or at least significantly reduced by the present invention. Furthermore, an equal distribution of the operating media over the width of the fuel cell, in particular in the distributor areas, is to be achieved.

The present invention provides a fuel cell, including a profiled anode plate and a profiled cathode plate, each having two distributor areas for conducting operating media, each having an anode gas main port for the supply and discharge of fuel, a cathode gas main port for the supply and discharge of oxidant, and a coolant main port for the supply and discharge of coolant, which are situated along a lateral edge, i.e., adjacent to one another, the plates being formed and positioned one over another in such a way that the bipolar plate has channels, which connect the operating means main ports to the active area. Furthermore, the distributor areas have at least one overlap section, in which the channels overlap one another in a non-fluidically connected way. It is provided according to the present invention that the cathode gas main port is situated between anode gas main port and coolant main port and, originating therefrom, cathode channels extend linearly across at least the distributor area of the fuel cell.

Channels are understood as open (i.e., grooved) or closed (i.e., tubular) fluid connections for the transport of the operating means. They may be formed as discrete channels or as a flow field, which enables a lateral flow.

A bipolar plate according to the present invention has the advantage in particular that due to of the linearity of the cathode channels, a water discharge is promoted and therefore clogging of the cathode channels as a result of a water accumulation is largely or completely prevented. Furthermore, as a result of the arrangement according to the present invention, all cathode channels are of equal length. The linearity is preferably continued beyond the distributor area into the active area and therefore extends over the entire plate from a cathode gas main port of one distributor area to a cathode gas main port of the other distributor area. This in turn promotes a homogeneous distribution of the pressure of reactant fluids (since these are provided in gaseous form in particular, they are also referred to hereafter as reactant gases) within the cathode channels across the entire area of the bipolar plate.

In the present case, ports are to be understood in particular as openings in the bipolar plate, which result in channels penetrating the stack in a fuel cell stack for guiding operating media.

The advantage of a homogeneous pressure distribution, in particular over the width of the bipolar plate, may be reinforced in that the cathode gas main port extends over the entire width of all cathode channels. Therefore, in one embodiment of the present invention, it is particularly preferred that a width of the bipolar plate be less in the active area than in the distributor area.

In the present case, a bipolar plate is divided into three areas, including two distributor areas and one active area. A first distributor area is used for the supply of operating media to the active area of the bipolar plate; a second distributor area is used for the removal of the operating media from the active area. Both distributor areas are preferably designed identically, in particular are convertible into one another by mirror symmetry, preferably rotational symmetry. In the distributor areas, the operating means main ports, i.e., anode gas main port, coolant main port, and cathode gas main port, are in turn situated adjacent to one another. In this case, adjacent to one another means that the operating means main ports are situated along a lateral edge, in particular a short lateral edge of the bipolar plate.

Typically, the operating means main ports are classifiable on the basis of their design, in particular their proportions. Thus, both in the related art and in the present invention, the cathode gas main port of the three different operating means main ports always has the largest open area; the open area of the anode gas main port, in contrast, is usually configured to be smaller than the areas of cathode gas main port and the coolant main port. The function of the particular operating means main port is thus also uniquely identifiable in the passive state in the present invention.

The active area, which is situated between the two distributor areas, is characterized in that, in the assembled state of the fuel cell stack, this area is opposite to an electrode of the membrane-electrode assembly. This means, the chemical reactions, which are the foundation for the energy generation in a fuel cell, take place in the active area.

The operating media in the present case are fluids, i.e., materials present in liquid or gaseous form, which are guided to the plate through the particular operating means main ports via suitable feeds. There are two reactant fluids, in particular a cathode operating means (oxidant) and an anode operating means (fuel), and also a coolant, preferably water. Oxygen is preferably used as the oxidant and hydrogen as the fuel.

According to the present invention, the cathode channels of a bipolar plate extend linearly over at least the distributor area. This is to be understood to mean in the present case that the cathode channels do not have any turns in a top view of the cathode plate. They are preferably situated in parallel to one another. Such an arrangement is located according to the present invention at least in the distributor area. This arrangement is also preferably continued over the entire length of the bipolar plate, i.e., also in the active area. The linear course of the cathode channels has the advantage that a water accumulation and clogging of the cathode channels accompanying this is prevented by an improvement of the hydraulic cross section in the entire cathode channel area. Furthermore, bipolar plates according to the present invention may be operated using a low-pressure strategy, i.e., an operating means pressure of less than 5 bar.

In one preferred embodiment of the present invention, it is provided that a main flow direction extends transversely to the cathode channels at least in a part of the correspondence section of the coolant. This has the advantage that the coolant is distributed uniformly over the entire width of all cathode channels. In particular, the outer edges, i.e., a first and a last cathode channel, are supplied with coolant which has nearly the same pressure and the same temperature.

Main flow direction is to be understood as the flow direction of the predominant part of the coolant. This is determined, on the one hand, by the momentum and the inertia of the water, but may be changed and/or redirected, on the other hand, by resistances, for example, transverse webs in the channel structure.

For this purpose, the coolant main port in the distributor area is situated adjacent to the cathode gas main port. In particular, it is situated outside an imaginary extension of the active area within the distributor area. In other words, the coolant main port is preferably located in a part of the distributor area which is located outside the width of the active area.

Proceeding from the coolant main port, coolant channels, which are situated in parallel to one another for the transport of coolant, initially extend in this embodiment in parallel to the cathode channels. Subsequently, the coolant channels are guided in a curved course at an angle of 75° to 95°, preferably an angle of 90°, in the direction of the cathode channels. The coolant channels are preferably formed over the entire bipolar plate as closed channels extending between the two plates. Between the coolant main ports and the overlap area, the coolant channels are preferably formed by grooves of one of the plates, preferably the cathode plate, which are pronounced in the direction of its outer surface. With the transition into a first overlap section, coolant channels result from the negative structure of the electrode channels, namely in the undulated structure on the side of the electrode plate facing away from the electrode side and therefore extend in parallel thereto (see FIG. 4).

The main flow direction of the coolant follows the structure of the coolant channels and is therefore aligned transversely, in particular orthogonally, in relation to the cathode channels in the overlap section, at which coolant channels and cathode channels meet one another.

The transversely extending main flow direction of the coolant is preferably provided over the entire width of all cathode channels. This is achieved, for example, in that, in the overlap sections, in addition to a flow of the coolant along the channel bottoms, a flow transverse to the channel bottoms, i.e., via the channel webs, is also possible. For this purpose, the overlap sections are preferably formed within the distributor area in such a way that the opposing channel webs of the two plates have no contact in relation to one another.

This may be achieved, for example, in that at least one of the plates has no discrete channels in the overlap sections, but rather a type of nub structure, in which only local projections are formed for the support of the plate, which are sufficiently spaced apart from one another, however. In this embodiment, the coolant channels of this section are therefore formed as an (oriented) flow pattern.

For example, at least one plate is used for the construction of the bipolar plate, which, in the second overlap section, does not have grooved, continuous depressions as in the related art, but rather nubby projections (see FIG. 6). The term nubby projections is understood as a bulge of an otherwise planar plate, which has a continuous circumferential contour with respect to the planar subsurface of the plate.

In another preferred embodiment, a transverse flow of the coolant is achieved in the overlap section by an arrangement of the anode channels in such a way that they extend in the same direction as the channel webs of the cathode channels, but the channel webs are not in contact with one another. For this purpose, an offset of the channels, in particular of one channel width, is preferred. Therefore, the channel bottoms of one plate are preferably situated congruently with the channel webs of the other plate, which has the result that the plates do not touch one another in this section and therefore the coolant extends between the plates overlapping with the channel structures of the anode and/or cathode plate and additionally also flows transversely in relation to these channels (see FIG. 4).

In addition to the possibility of the transverse flow of the coolant in the overlap section, such an arrangement has the advantage that the effective height of the individual channels (cathode, anode, and coolant channels), which results from the height of the bipolar plate, may be designed to be comparatively greater than in a conventional arrangement, in which cathode and anode channels, i.e., the particular channel webs, are situated in parallel one over another and are in contact with one another. The hydraulic cross section may therefore be optimized not only for the coolant, but rather also for the reactant gases, which in turn results in an improved pressure distribution of all operating media.

In another embodiment of the present invention, it is preferred that the anode channels be situated in an overlap section orthogonally in relation to the cathode channels. This advantageously has the result that the fuel may be distributed over the entire width of the cathode channels and/or the entire width of the active area with preferably homogeneous pressure distribution, i.e., nearly without pressure loss, and supplied to the active area.

One possible embodiment of this specific embodiment provides that the anode gas main port is situated adjacent to the cathode gas main port opposite to the coolant main port of the same distributor area. In particular, the anode gas main port inside the distributor area is situated outside a width of the active area. Proceeding from the anode gas main port, anode channels extend in parallel to one another and initially additionally in parallel to the cathode channels. They are subsequently redirected and guided at a right angle (85° to 95°) in relation to the cathode channels. At least one anode channel is subsequently formed in such a way that it extends over the entire width of all cathode channels situated adjacent to one another. This is preferably an outer anode channel facing toward the cathode gas main port. At least one further anode channel, in particular the outer anode channel facing away from the cathode gas main port, in contrast, preferably does not extend over the entire width of the cathode channels. At least a part of the anode channels in the overlap section therefore extend transversely, i.e., orthogonally, in relation to the cathode channels.

The specific embodiments of parallel offset anode channels and channels situated orthogonally in relation to the cathode channels are particularly advantageously combinable with one another. For this purpose, the overlap section is preferably divided into two parts, which are preferably provided in equal size. In one of these parts, the first overlap section in the form of adjoining triangles, which adjoins the active area, the anode channels extend in parallel and offset in relation to the cathode channels. In the other part, in contrast, the second overlap section, they extend orthogonally in relation to the cathode channels. The two parts preferably each represent right triangles, the hypotenuses of the two triangles coinciding. In the area of the hypotenuses, a transition takes place from the second overlap section having anode channels extending transversely in relation to the cathode channels into the first overlap section having anode channels extending in parallel and offset in relation to the cathode channels. Furthermore, the opposite leg of the particular triangle is defined by the width of all cathode channels, i.e., by the width of the active area.

In another embodiment of the present invention, it is preferred that the cathode channels and the anode channels be situated in parallel one over another in the active area of the bipolar plate. In the active area, anode and cathode channels thus preferably extend congruently one over another, so that the anode channel bottoms are preferably in contact over the entire length of the active area of the bipolar plate with the particular cathode channel bottoms situated opposite and form discrete coolant channels in the resulting interspaces. This has the advantage that the bipolar plate in the active area additionally fulfills the function of support and electrical conduction between the plates. The main flow directions of all operating media are in parallel to one another in the active area in this embodiment.

The channels of the particular reactant fluid are generally formed by the profile of the associated electrode plate. This means, the anode channels are defined by the design of the anode plate, while the cathode channels result from the profile of the cathode plate. The coolant channels result from the associated negative profile of the two. In one preferred embodiment of the present invention, it is preferred that the coolant channels proceeding from the coolant main port be provided in the distributor area on only one of the plates, in particular the cathode plate. The counter plate does also delimit the resulting coolant channel, but is formed as planar (non-profiled) in the affected area. The supply of the coolant from the coolant main port up to the overlap with the cathode channels is therefore solely determined by the profile in the cathode plate. Alternatively, it is preferred that such an embodiment of the coolant channels in the distributor area only be located on the anode plate. These embodiments primarily have a production advantage.

The present invention furthermore relates to a fuel cell, including a stack of a plurality of bipolar plates according to the present invention and a plurality of membrane-electrode assemblies, the bipolar plates and the membrane-electrode assemblies being stacked one over another in alternation.

A fuel cell according to the present invention advantageously has an optimized pressure distribution having a low pressure loss of the operating media, in particular the coolant, over the individual bipolar plates, but also over the entire fuel cell stack.

In one preferred embodiment, at least one clamping element is situated along the fuel cell stack in parallel to the active areas of the bipolar plates between the distributor areas. If, according to one preferred embodiment, a width of the bipolar plate in the active area is less than in the distributor area, lateral recesses result in the stack, within which the at least one clamping element is situated. This has the advantage that the clamping element builds up pressure on the bipolar plates in particular in the active area of the fuel cell, in which the demands on the resulting seal are highest. Furthermore, in this area, a bipolar plate according to the present invention is provided as more stable, so that the pressure applied by the clamping element may be higher than if the clamping element were situated in the distributor area. This increase of the possible maximum pressure in turn has a positive effect on the seal in the active area. The clamping element is designed in particular as a spring packet.

The fuel cell may be used for mobile or stationary applications. In particular, it is used for the power supply of an electric motor for the drive of a vehicle. Therefore, another aspect of the present invention relates to a vehicle which includes a fuel cell according to the present invention.

The various specific embodiments of the present invention mentioned in this application are advantageously combinable with one another, if not stated otherwise in the individual case.

BRIEF DESCRIPTION OF THE DRAWINGS

The present invention is explained hereafter in exemplary embodiments on the basis of the associated drawings.

DETAILED DESCRIPTION

Figure 1:
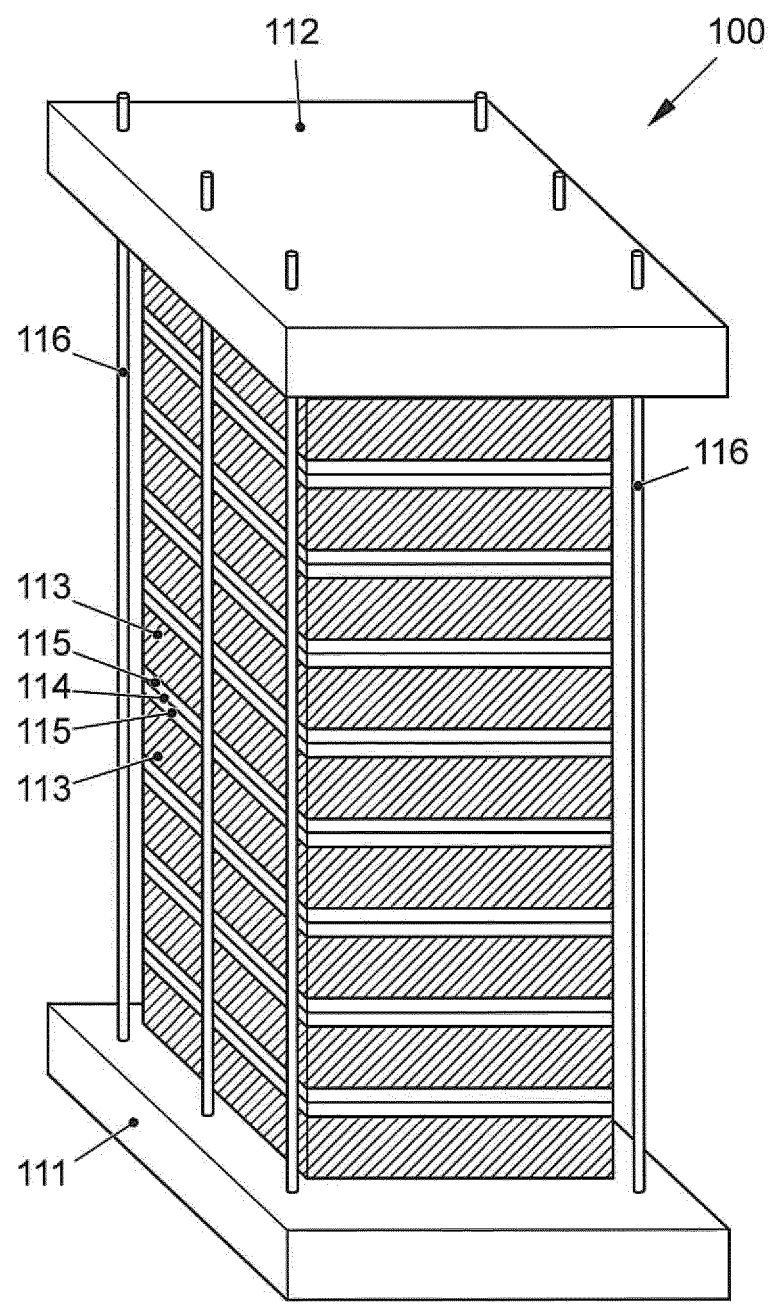
FIG. 1 shows a schematic view of a fuel cell stack.

FIG. 1 shows a fuel cell stack in a very schematic view. Fuel cell stack 100 includes a first end plate 111 and a second end plate 112. A plurality of stack elements stacked one over another, which include bipolar plates 113 and membrane-electrode assemblies 114, is situated between end plates 111, 112. Bipolar plates 113 are stacked alternately with membrane-electrode assemblies 114. Membrane-electrode assemblies 114 each include a membrane and electrodes adjoining on both sides of the membrane, namely an anode and a cathode. Membrane-electrode assemblies 114 may additionally have gas diffusion layers adjoining the membrane. Sealing elements 115, which seal the anode and cathode chambers in a gas-tight manner to the outside, are situated in each case between bipolar plates 113 and membrane-electrode assemblies 114. Fuel cell stack 100 is compressed with the aid of clamping elements 116, for example, draw bars or clamping plates, between end plates 111 and 112.

In FIG. 1, only the narrow sides of bipolar plates 113 and membrane-electrode assemblies 114 are visible. The main surfaces of bipolar plates 113 and membrane-electrode assemblies 114 press against one another. The view in FIG. 1 is partially not true to scale. A thickness of a single cell, including a bipolar plate 113 and a membrane-electrode assembly 114, is typically a few millimeters, membrane-electrode assembly 114 being the much thinner component. In addition, the number of the single cells is typically substantially greater than shown.

Figure 2:
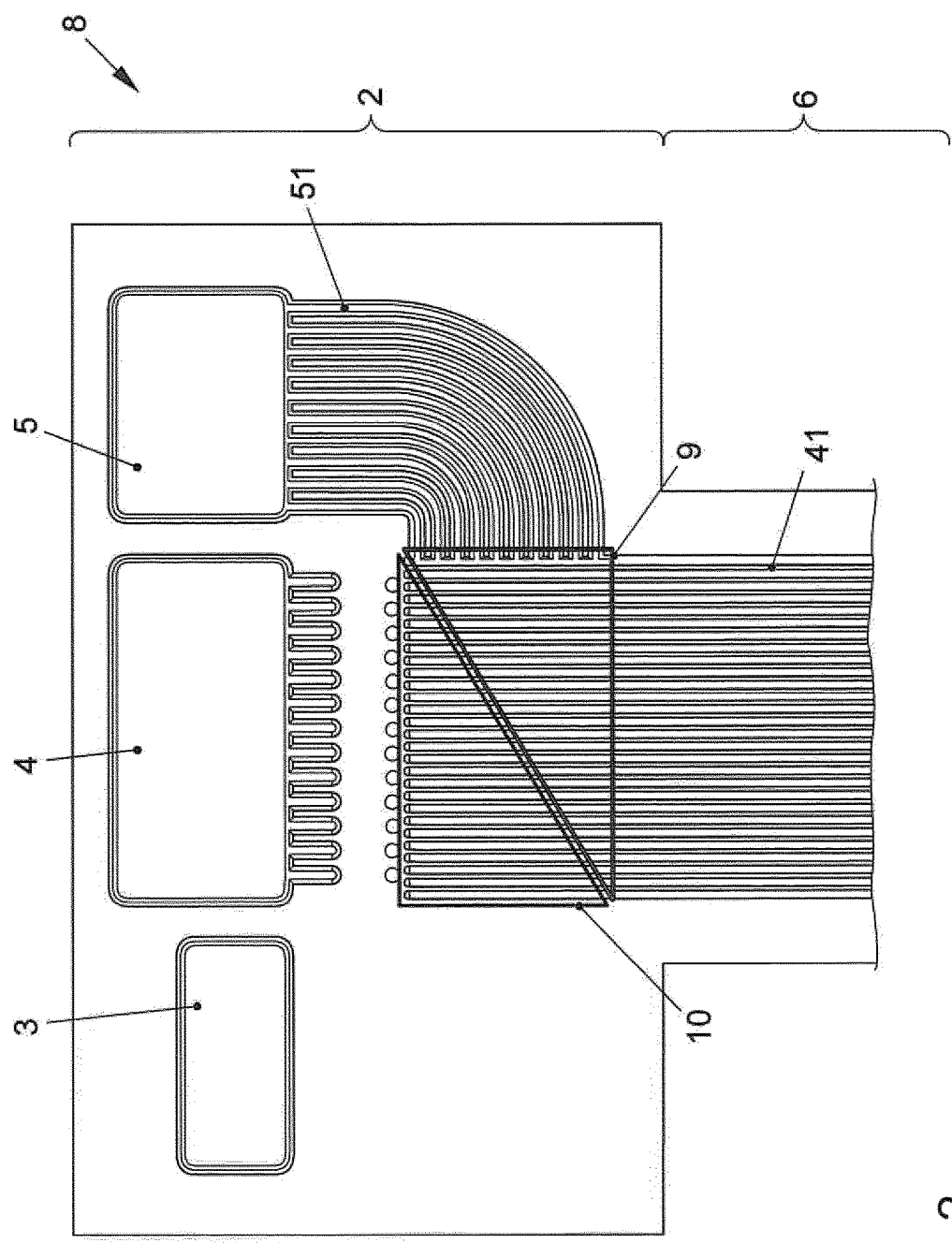
FIG. 2 shows a top view of a part of a cathode plate of a bipolar plate according to the present invention in a first embodiment of the present invention.

FIG. 2 shows a detail of a cathode plate 8 of a bipolar plate. This detail includes a distributor area 2 and an active area 6. A further distributor area adjoins on the opposite side of the active area.

Cathode plate 8 is manufactured from an electrically conductive material, preferably a metallic material. It has a profile to form channels at 41, 51 both in active area 6 and in distributor area 2.

Distributor area 2 has three openings, so-called operating means main ports to form operating means main channels, namely an anode gas main port 3, a cathode gas main port 4, and a coolant main port 5. Operating means main ports 3, 4, and 5 are located adjacent to one another along an edge of cathode plate 8. Anode gas main port 3 has the smallest open area, cathode gas main port 4, which is situated in the middle between anode gas and coolant main ports 3 and 5, has the largest open area, while coolant main port 5 has an open area which is larger than that of anode gas main port 3 and smaller than that of cathode gas main port 4. Cathode channels 41 are formed as grooved, i.e., as open channels, by a corresponding profile of plate 8.

Proceeding from cathode gas main port 4, cathode channels 41 extend linearly, i.e., essentially linearly without turns, curves, or hairpin bends, over distributor area 2 and active area 6. The width of all cathode channels 41, which are situated adjacent to one another and in parallel, essentially corresponds in total to the width of cathode gas main port 4.

From coolant main port 5, coolant channels 51 lead to cathode channels 41. In contrast to cathode channels 41, coolant channels 51 are formed as closed channels, which extend between plate 8 and plate 7 situated underneath it. In the illustrated specific embodiment, coolant channels 51 display a larger open area than cathode channels 41. Coolant channels 51 are situated in parallel to one another and, proceeding from coolant channel main port 5, initially extend in parallel to cathode channels 41. At the height of cathode channels 41, the profile of cathode plate 8 is formed in such a way that resulting coolant channels 51 extend in a curve transversely, i.e., at an angle of approximately 90° (preferably 80° to 95°, in particular 85° to 95°) toward coolant channels 41. Proceeding therefrom, coolant channels 51 overlap cathode channels 41 in an overlap section, which is divided into a first overlap section 9 and a second overlap section 10. Overlap sections 9 and 10 are essentially of equal size and are provided identically on cathode plate 8.

Figure 3:
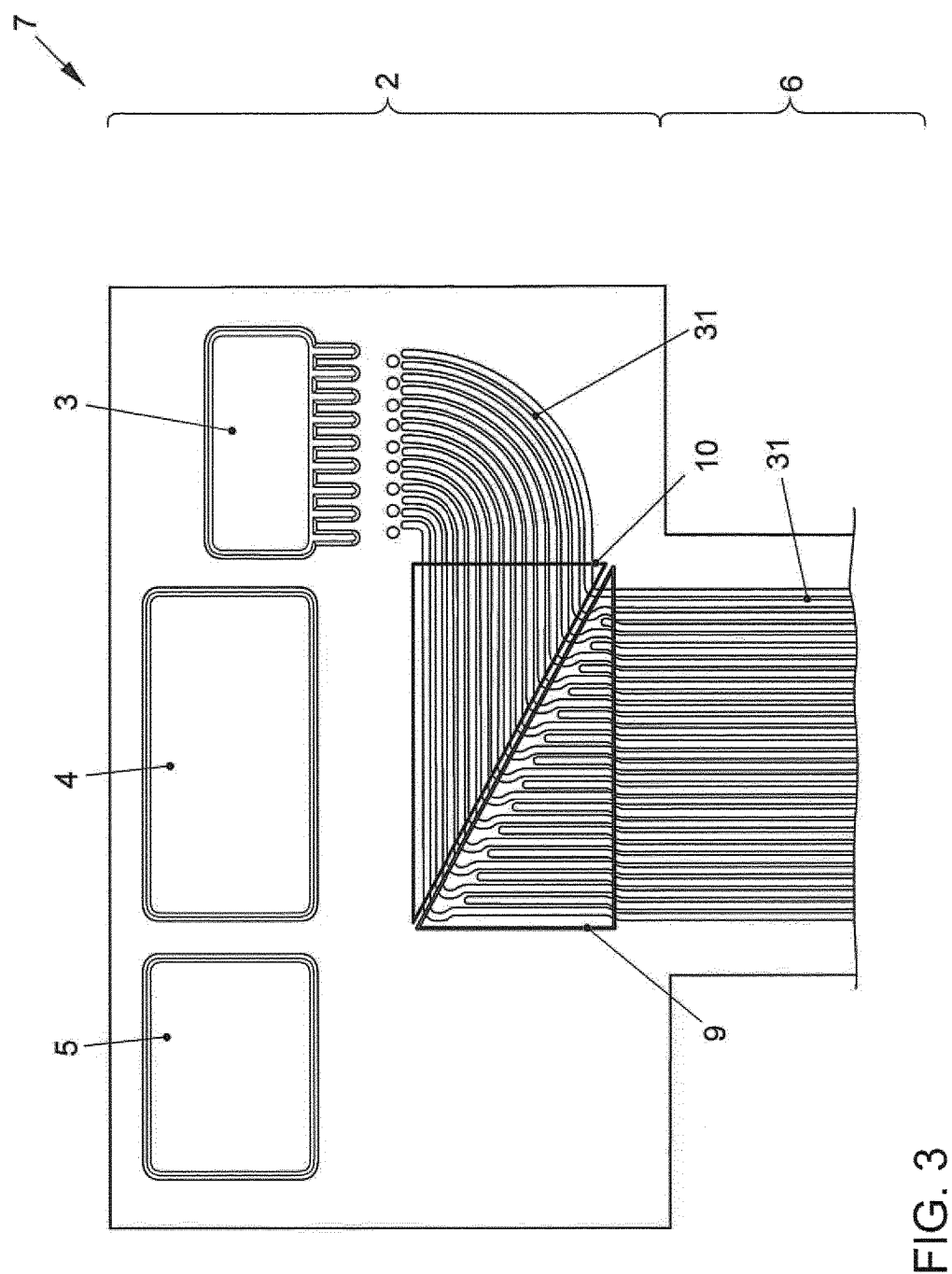
FIG. 3 shows a top view of a part of an anode plate of a bipolar plate according to the present invention in the first embodiment of the present invention.

FIG. 3 shows an anode plate 7, which represents the counterpart of cathode plate 8 shown in FIG. 2 for forming a joint bipolar plate 1. In other words, FIG. 3 shows the rear side of the bipolar plate from FIG. 2. Anode plate 7 is also only shown in a detail in FIG. 3, which may be divided into a distributor area 2 and an active area 6. Distributor area 2 has openings for coolant main port 5, cathode gas main port 4, and anode gas main port 3. These are provided in shape, size, and arrangement like corresponding operating means main ports 3, 4, and 5 of cathode plate 8 shown in FIG. 2. The mirrored arrangement of the channels (coolant channel on the outside right in FIG. 2, coolant channel 5 on the outside left in FIG. 3) is caused because, to form a shared bipolar plate 1, anode plate 7 and cathode plate 8 are applied to one another in such a way that the sides concealed in each of the figures face toward one another, so that coolant may be guided in the interspaces formed by the structure.

Anode plate 7 has, like cathode plate 8 shown in FIG. 2, a structure-providing profile in the form of an undulated cross section, whereby open anode channels 31 are formed on the surface of anode plate 7. Before anode channels 31 extend in active area 6 of anode plate 7 congruently with cathode channels 41 of cathode plate 8, they extend over a first overlap section 9 and a second overlap section 10 through distributor area 2.

In first overlap area 9, anode channels 31 extend, offset by one channel width in relation to the anode channels, in directly adjoining active area 6. First overlap area 9 describes a right triangle, the first leg thereof corresponding to the total of the width of all anode channels 31 in active area 6. The length of the second leg, in contrast, essentially corresponds to the width of anode gas main port 3 and is situated on the side facing away from anode gas main port 3 of an anode flow field resulting from the total of anode channels 31.

The hypotenuse of the right triangle of first overlap section 9 represents a transition from first overlap section 9 to second overlap section 10. The latter also describes the shape of a right triangle, the hypotenuses of the two triangles are congruent and the total of the triangular areas results in a rectangle, third overlap section 11. Anode channels 31 extend inside second overlap section 10 in parallel to the first leg of the right triangle of second overlap section 10. The number of anode channels 31, originating from anode gas main port 3 up into second overlap section 10, may be less than or equal to the number of cathode channels 41 in active area 6. The transition to a larger number of channels takes place in first overlap section 9. This may take place, as shown in FIG. 3, in such a way that anode channels 31 are initially situated uniformly distributed over the entire width of cathode gas main port 4. A greater distance of the channel webs thus initially results and therefore a larger diameter and/or cross section of anode channels 31. Within this enlarged diameter, further channel webs are preferably situated, so that the number of anode channels 31 increases, in particular doubles. The number of anode channels 31 of an anode plate 7 in first overlap section 9 and in active area 6, as shown in FIG. 3, preferably corresponds to the number of cathode channels 41 of a corresponding cathode plate 8, as shown, for example, in FIG. 2.

Figure 4:
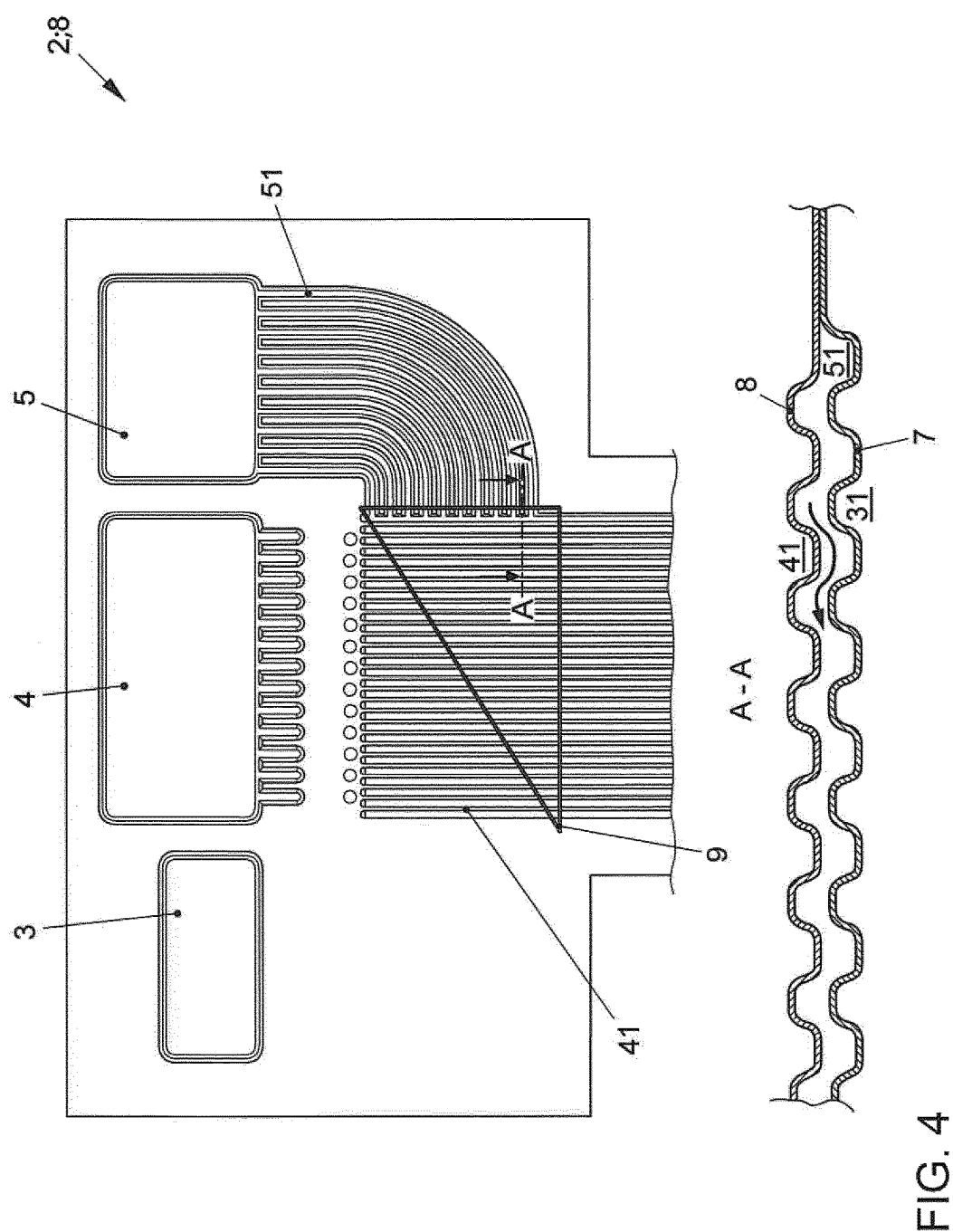
FIG. 4 shows a top view of the distributor area of a cathode plate of a bipolar plate according to the present invention in the first embodiment of the present invention, in a sectional view along section A-A of the bipolar plate.

Cathode plate 8 may be assembled with anode plate 7 to form a bipolar plate 1 as shown in FIG. 4. For this purpose, the particular coolant sides of the electrode plates face toward one another in such a way that corresponding operating means main ports 3, 4, and 5 in the distributor area are located one over another congruently.

FIG. 4 shows a distributor area 2 of a bipolar plate 1 according to the present invention in a top view of cathode plate 8. Furthermore, FIG. 4 shows a section through a bipolar plate 1 according to the present invention within first overlap area 9 transversely in relation to the course of cathode channels 41. This section, which is shown by A-A, shows that within first overlap section 9, the channel webs and/or channel bottoms of anode plate 7 and cathode plate 8 are not in contact with one another. This results because anode channels 31 are situated offset in relation to cathode channels 41. In particular, they are situated offset in relation to one another by one channel width, in particular one cathode channel width. As a result, coolant channels 51 do not extend discretely between particular plates 7 and 8, i.e., are not laterally delimited and separated from one another, but rather a transverse flow is possible in addition to the main flow direction defined by the channel guide. Since coolant channels 51, as shown in FIG. 4, are supplied to the entirety of cathode channels 41, i.e., a cathode flow field, at a right angle, a main flow direction of the coolant results within second overlap section 10 made of coolant channels 51 and cathode channels 41 (second overlap section 10) which extends transversely in relation to cathode channels 41. Due to this main flow direction, in particular in conjunction with the transverse flow of the coolant enabled in first overlap section 9, the coolant may be distributed over the entire width of the cathode flow field nearly without pressure loss.

Figure 5:
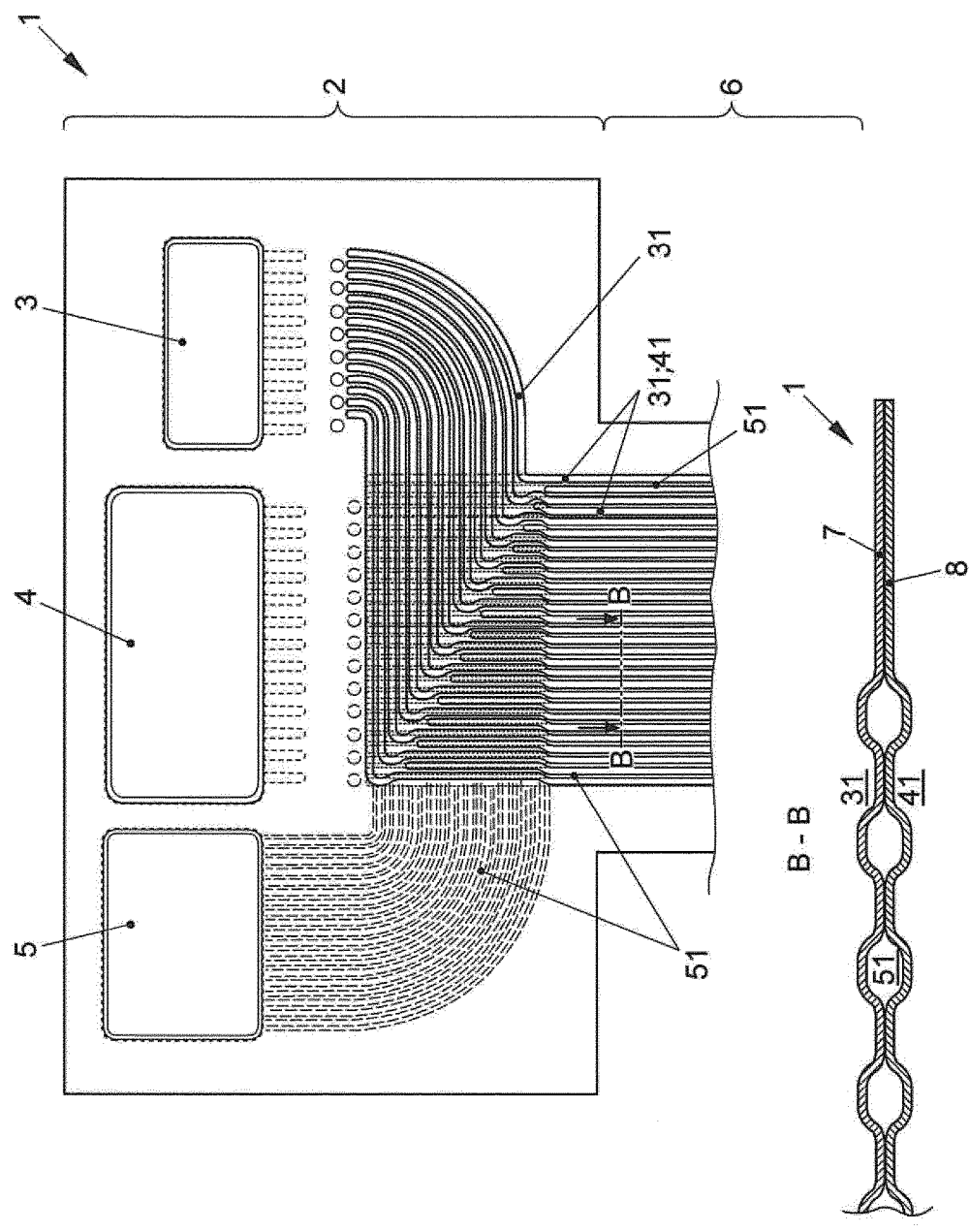
FIG. 5 shows a wireframe model drawing of a part of a bipolar plate according to the present invention in the first embodiment of the present invention in a sectional view along section B-B of the bipolar plate.

FIG. 5 shows a detail of a bipolar plate 1 according to the present invention, which essentially corresponds to bipolar plate 1 shown in FIG. 4, but in a view toward anode plate 8. Both the structure of anode plate 7 and the structure of concealed cathode plate 8 are shown in distributor area 2 and active area 6. It is shown that in active area 6, anode channels 31 and cathode channels 41 are situated directly one over another, in contrast to distributor area 2. In the top view shown, anode channels 31 and cathode channels 41 are thus situated congruently one over another. The channel webs of anode and cathode channels 31 and 41 form the channel bottoms of coolant channels 51 on the coolant side. As shown by sectional view B-B in the active area of bipolar plate 1, discrete coolant channels 51 are formed in active area 6. A transverse flow of coolant between adjacent coolant channels 51 is not possible due to the contact between anode plate 7 and cathode plate 8 in the active area.

The contact of anode plate 7 and cathode plate 8 in the area of the channel bottoms of anode and cathode channels 31, 41 represents an electrically conductive link for the series connection within the fuel cell stack, on the one hand, and has a supporting function, on the other hand.

Figure 6:
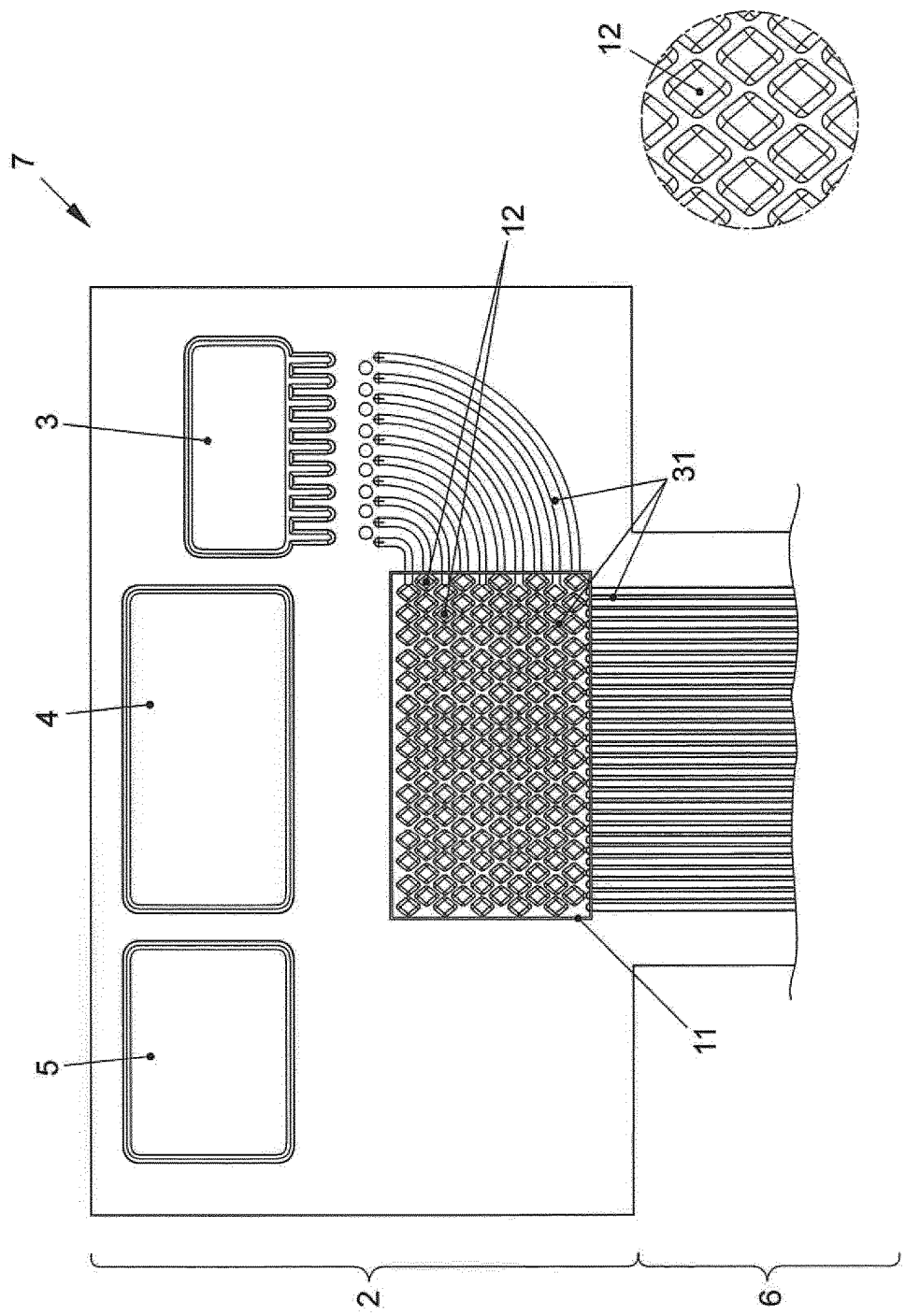
FIG. 6 shows a top view of a part of a cathode plate of a bipolar plate according to the present invention in a second embodiment of the present invention.

FIG. 5 shows the detail of an anode plate 7 in another embodiment of the present invention. In comparison to the embodiment shown in FIGS. 2 through 5, the anode plate has a deviating structure in distributor area 2. Anode plate 7 shown in FIG. 6 is also fundamentally constructed like anode plate 7 shown in FIG. 3. It has three operating means main ports in distributor area 2, namely a coolant main port 5, a cathode gas main port 4, and an anode gas main port 3. Proceeding from anode gas main port 3, anode channels 31 lead in the direction of a flow field. Anode channels 31 extend, as in FIG. 3, in a curve from anode gas main port 3 to the flow field, so that they are incident thereon at an angle of 90°. In particular, they are incident on an overlap section 11 in the flow field, which represents the connection between port-side anode channels 31 and anode channels 31 of active area 6.

The size and shape of this overlap section 11 essentially corresponds to the total of first and second overlap sections 9 and 10 described in FIG. 3. However, it differs in particular from first and second overlap sections 9 and 10 in that the profile of anode plate 7 does not form discrete channel structures in this area. Rather, this area has separate nubby projections 12, which may have the shape of circles, ellipses, rhomboids, or rectangles, for example. In the illustrated specific embodiment, they display the shape of rhomboids. They are situated in offset rows and are spaced apart from one another in such a way that they form a plurality of flow paths. The fuel supplied via anode gas main port 3 to anode channels 31 is thus distributed uniformly in active area 6 in overlap section 11.

Anode plate 7 shown in FIG. 6 may be combined with an equivalently provided cathode plate, or with cathode plate 8 shown in FIG. 2, to form a bipolar plate 1.

Figure 7:
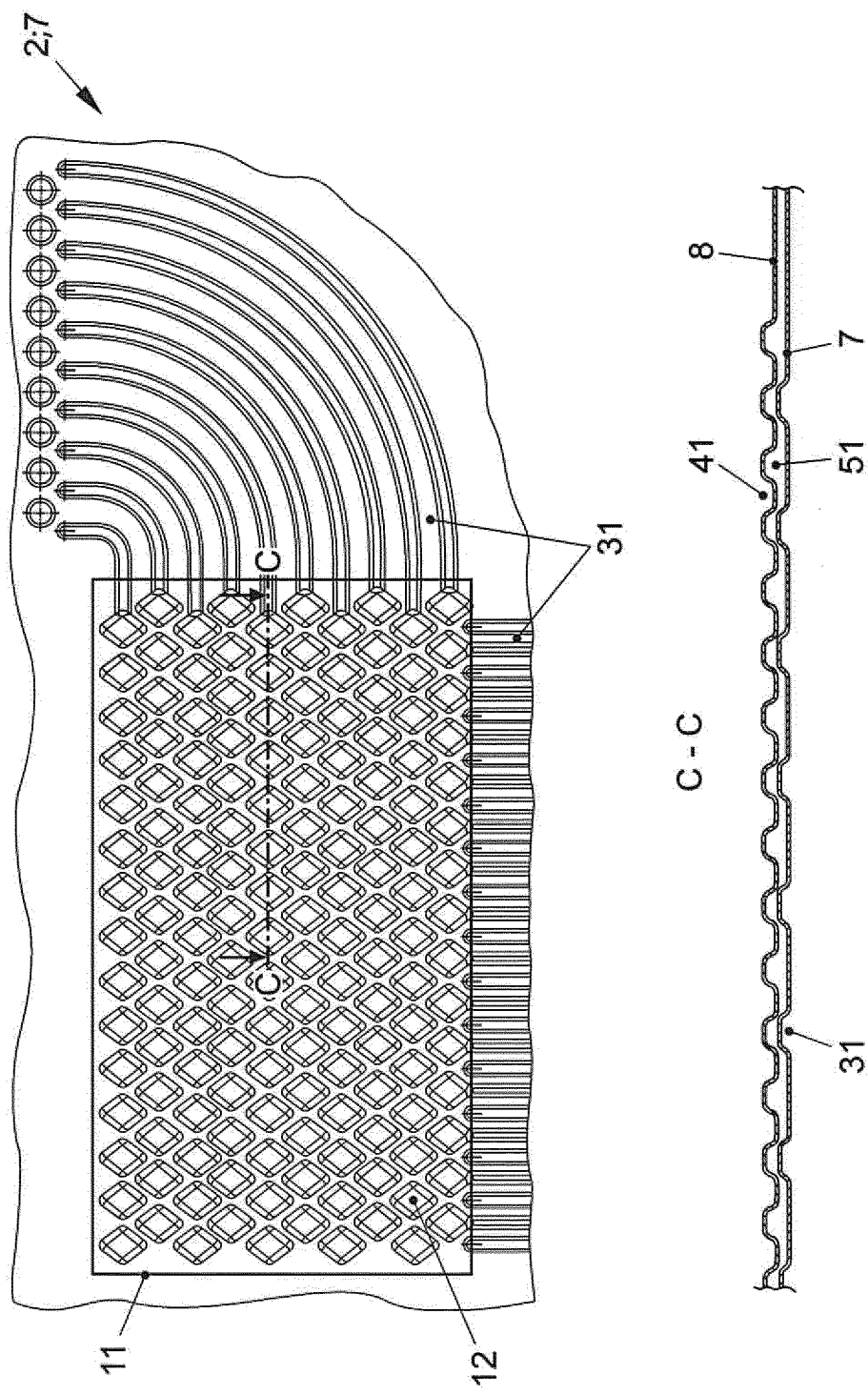
FIG. 7 shows a top view of the distributor area of a cathode plate of a bipolar plate according to the present invention in the second embodiment of the present invention in a sectional view along section C-C of the bipolar plate.

The latter embodiment is shown in FIG. 7. FIG. 7 shows in particular distributor area 2 of anode plate 7 shown in FIG. 6 and a cross section through bipolar plate 1 inside overlap section 11 transversely to the flow direction of cathode channels 41.

Cross-sectional view C-C shows that rhomboid nubby projections 12 of anode plate 7 are situated over cathode plate 8 in such a way that depressions of the anode plate or the bottoms of anode channels 31 extend congruently with the webs of the channel structure of cathode plate 4. Therefore, no contact takes place between anode plate 3 and cathode plate 4 in overlap section 11 of distributor area 2. The coolant flow area enclosed by anode plate 7 and cathode plate 8 does not have, as in the first embodiment in overlap section 11, discrete channels, but rather a flow field. Rather, the coolant may flow transversely over entire width $b_a$ of the cathode flow field without noticeable pressure loss and be distributed from there over the cathode and anode flow fields up to and over the flow field of the active area.

Figure 8:
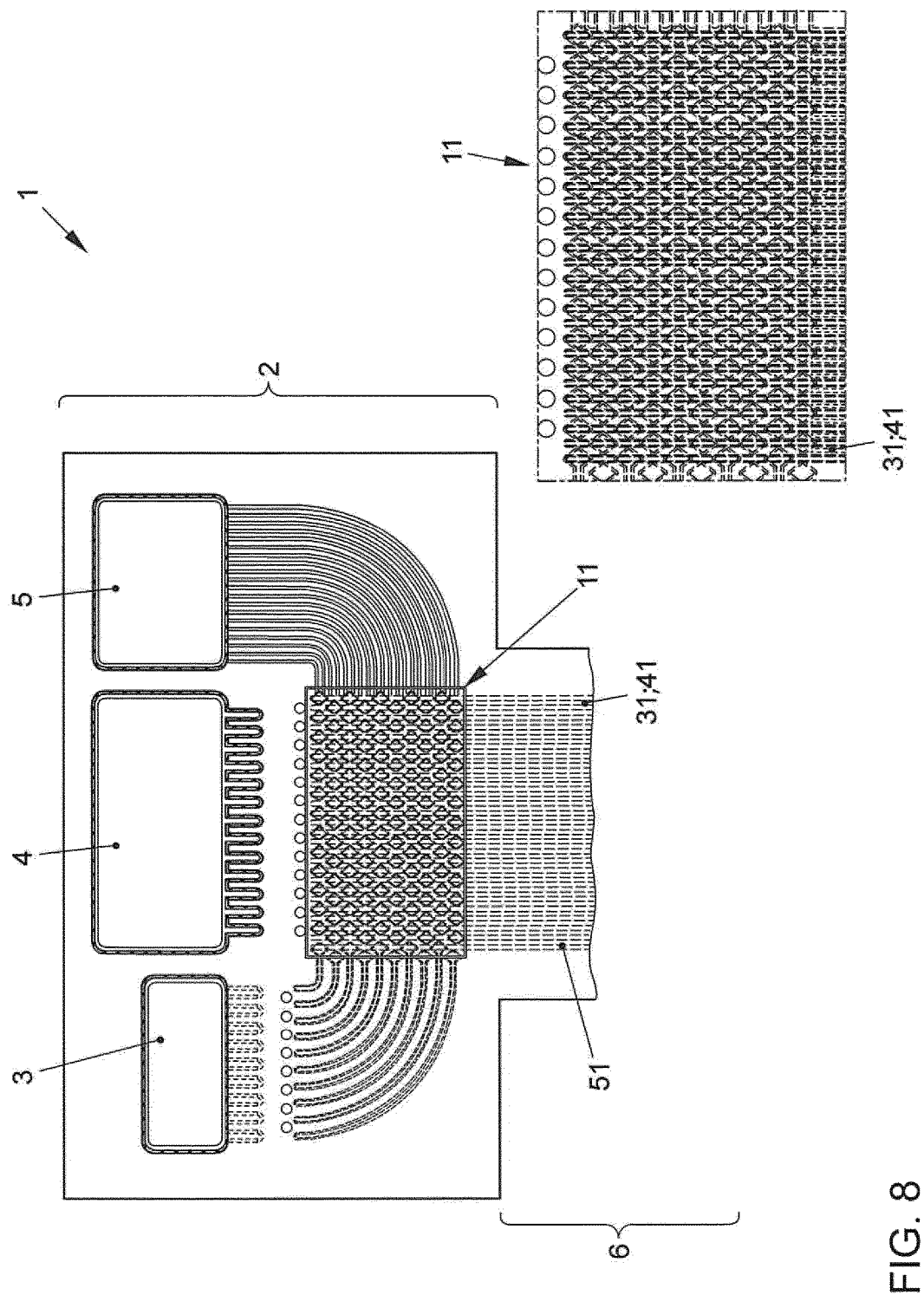
FIG. 8 shows a wireframe model drawing of a part of a bipolar plate according to the present invention in the second embodiment of the present invention.

For better illustration, FIG. 8 shows a bipolar plate 1 according to the present invention in the second embodiment in a top view of cathode plate 4. The structure of concealed anode plate 3 is shown by dashed lines.

LIST OF REFERENCE NUMERALS

1 bipolar plate
2 distributor area
3 anode gas main port
4 cathode gas main port
5 coolant main port
6 active area
7 anode plate
8 cathode plate
9 first overlap section
10 second overlap section
11 third overlap section
12 nubby projections
31 anode channels
41 cathode channels
51 coolant channels
100 fuel cell
111 first end plate
112 second end plate
113 bipolar plate (prior art)
114 membrane-electrode assembly
115 sealing element
116 clamping element

What is claimed is:
1. A bipolar plate for a fuel cell comprising:
a profiled anode plate and a profiled cathode plate, each having an active area and two distributor areas for the supply and removal of operating media to or from, respectively, the active area, the distributor areas each having an anode gas main port for the supply and discharge of fuel, a cathode gas main port for the supply and discharge of oxidants, and a coolant main port for the supply and discharge of coolant, the anode gas main port, the cathode gas main port and the coolant main port situated along a lateral edge of the bipolar plate, the anode and cathode plates being formed and situated one over another in such a way that the bipolar plate has channels for the operating media, the channels connecting the anode gas main port, the cathode gas main port and the coolant main port of both distributor areas to one another, the distributor areas having at least one overlap section, the channels overlapping one another in a non-fluidically connected way in the at least one overlap section, the cathode gas main port being situated between the anode gas main port and the coolant main port and cathode channels of the channels proceeding from the cathode gas main port extending linearly at least across the distributor area of the bipolar plate.

2. The bipolar plate as recited in claim 1 wherein a main flow direction of the coolant extends transversely in relation to the cathode channels at least in a partial area of the overlap section.

3. The bipolar plate as recited in claim 1 wherein anode channels of the channels proceeding from the anode gas main port are situated in parallel and offset in relation to the cathode channels in a first overlap section of the at least one overlap section.

4. The bipolar plate as recited in claim 1 wherein anode channels of the channels are situated transversely, in particular orthogonally, in relation to the cathode channels in a second overlap section of the at least one overlap section.

5. The bipolar plate as recited in claim 1 wherein the cathode channels and anode channels of the channels are situated in parallel and one over another in the active area.

6. The bipolar plate as recited in claim 1 wherein a width of the bipolar plate is less in the active area than in the distributor area.

7. The bipolar plate as recited in claim 1 further comprising coolant channels proceeding further from the coolant main port and provided in the distributor area by a profile of the cathode plate.

8. A fuel cell comprising:
a stack of a plurality of the bipolar plates as recited in claim 1; and
a plurality of membrane-electrode assemblies, the bipolar plates and the membrane-electrode assemblies being stacked alternately one over another.

9. The fuel cell as recited in claim 8 further comprising at least one clamping element situated between the distributor areas.

* * * * *